United States Patent [19]

Mikroyannidis et al.

[11] Patent Number: 4,587,324
[45] Date of Patent: May 6, 1986

[54] POLYMER OF PHOSPHONYLMETHYL-2,4-AND -2,6-DIAMINO BENZENE AND POLYFUNCTIONAL MONOMER

[75] Inventors: John A. Mikroyannidis, Patras, Greece; Demetrius A. Kourtides, Gilroy, Calif.

[73] Assignee: The United States of America as represented by the Administrator, National Aeronautics and Space Administration, Washington, D.C.

[21] Appl. No.: 641,142

[22] Filed: Aug. 16, 1984

Related U.S. Application Data

[63] Continuation-in-part of Ser. No. 522,629, Aug. 12, 1983, abandoned.

[51] Int. Cl.[4] .................... C08G 59/06; C08G 59/18
[52] U.S. Cl. .................................. 528/108; 528/124; 528/337; 528/352; 528/399; 528/406; 528/407
[58] Field of Search ............... 528/108, 124, 337, 352, 528/399, 406, 407

[56] References Cited

U.S. PATENT DOCUMENTS 3,376,258  4/1968  Gysling et al. .................... 528/337

*Primary Examiner*—Harold D. Anderson
*Attorney, Agent, or Firm*—Darrell G. Brekke; John R. Manning; Robert D. Marchant

[57] ABSTRACT

Compounds having the general formula 1

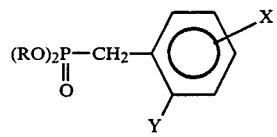

wherein X and Y are functional groups, preferably amino groups, are polymerized with, for example, polyfunctional epoxides to provide heat and fire resistant polymers useful for making flame and fire resistant polymer structures such as for aircraft secondary structures. The groups R in 1 are preferably alkyl and lower halo (e.g., chloro) alkyl.

11 Claims, No Drawings

4,587,324

POLYMER OF PHOSPHONYLMETHYL-2,4-AND -2,6-DIAMINO BENZENE AND POLYFUNCTIONAL MONOMER

DESCRIPTION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

RELATED APPLICATIONS

This application is a continuation-in-part of our co-pending application Ser. No. 522,629 filed Aug. 12, 1983 abandoned. This application is also related to the following commonly assigned patent applications: U.S. Ser. No. 641,152, filed Aug. 16, 1984 which is directed to dinitrobenzene compounds of the formula:

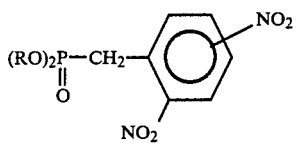

and the corresponding amines which are employed herein as monomers; U.S. Ser. No. 641,153, filed Aug. 16, 1984 which is directed to polyamides prepared from the above diaminobenzenes; U.S. Ser. No. 641,143, now U.S. Pat. No. 4,536,565, filed Aug. 16, 1984 which is directed to polyimides and copolyimides prepared from the above diaminobenzenes; and U.S. Ser. No. 641,147, filed Aug. 16, 1984 which is directed to maleimido and citraconimido-substituted derivatives of the above diaminobenzenes, all of which are pending.

FIELD OF THE INVENTION

The invention relates to fire and heat resistant polymers having good mechanical properties which are useful, for example, as laminating agents for structural parts, interior components and secondary structures of aircraft and space vehicles.

BACKGROUND OF THE INVENTION

Polymers such as, for example, epoxy polymers resulting from the curing of epoxy materials with diamines such as m-phenylene diamine are deficient with respect to fire and heat resistance. It has been proposed to improve these properties by adding fire and heat resistant materials such as ammonium phosphate and organo phosphorus compounds. However, these additives degrade the mechanical properties of the polymer.

Some references authored by the inventors which describe fire resistant compositions of phosphorus-containing resins and the monomers thereof include the following:

1. J. A. Mikroyannidis and D. A. Kourtides, "Fire-Resistant Compositions of Epoxy Resins with Phosphorus Compounds", Symposium on Rubber-Modified Thermoset Resins, 186th Annual American Chemical Society Meeting, Washington, D.C., Abstract PMSE 133, Aug. 28–Sept. 2, 1983;

2. J. A. Mikroyannidis and D. A. Kourtides, "Fire-Resistant Epoxy Resins Containing 1-(Di(2-Chloroethoxyphosphinyl)Methyl)-2,4- and -2,6-Diaminobenzene as Curing Agent", Proceedings of the 12th North American Thermal Analysis Society Conference, Williamsburg, VA (September 1983);

3. J. A. Mikroyannidis and D. A. Kourtides, "Curing of Epoxy Resins with 1-[Di(2-Chloroethoxyphosphinyl)Methyl]-2,4- and 2,6-Diaminobenzene", Journal of Applied Polymer Science, Vol. 29, pp. 197–209, (1984);

4. J. A. Mikroyannidis and D. A. Kourtides, "Curing of Epoxy Resins with 1-[Di(2-Chloroethoxyphosphinyl)Methyl]-2,4- and 2,6-Diaminobenzene", National Aeronautics and Space Administration Report No. TM 84350, October 1983;

5. J. A. Mikroyannidis and D. A. Kourtides, "Synthesis and Characterization of Phosphorus-Containing Polyamides and Copolyamides based on 1-[Dialkoxyphosphinyl)Methyl]-2,4- and -2,6-Diaminobenzenes", Journal of Applied Polymer Science, Vol. 29, pp. 941–953 (1984);

6. J. A. Mikroyannidis and D. A. Kourtides, "Synthesis and Characterization of Phosphorus Containing Polyamides and Copolyamides Based on 1-[(Dialkoxyphosphinyl)Methyl]-2,4- and -2,6-Diaminobenzenes", Proceedings of the Society for the Advancement of Materials and Process Engineering, Reno, NV (April 1984); and 7. J. A. Mikroyannidis and D. A. Kourtides, "Curing of Epoxy Resins with 1-[Di(2-Chloroethoxyphosphinyl)Methyl]-2,4- and -2,6-Diaminobenzene", Proceedings of the Society of Plastics Industry Annual Spring Meeting, St. Louis, MO (May 1984).

These references are not to be construed as prior art for the present invention.

OBJECTS OF THE INVENTION

It is an object of the invention to provide polymers which are useful for purposes such as, for example, lamination which combine good fire and heat resistance with good mechanical properties.

BRIEF SUMMARY OF THE INVENTION

In accordance with the invention a phosphonylmethylbenzene having the general formula:

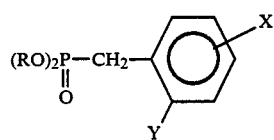

is provided and is polymerized with a monomer such as an epoxide, a dianhydride, etc. The method described is to produce a phosphorus-containing polymer of the formula which comprises polymerizing a compound of the formula 1 with a polyfunctional monomer, where R is an organic group attached to the oxygen atom through a carbon atom, and X and Y are functional groups polymerizable with the polyfunctional monomer. In 1 the R groups may be the same or different and they may be aliphatic, cycloaliphatic or aromatic, preferably being lower alkyl [methyl, ethyl, propyl (n and iso), etc.] and most advantageously contain a halogen such as chlorine. X and Y are functional groups which are polymerizable with, for example, epoxy or anhydride groups and they may be the same or different. Preferably X and Y are amino group and they will be predominantly in the 2- and 4-positions relative to the phosphonyl methyl group. X and Y may also be hydroxyl, carboxyl, etc.

The resulting polymers have the repeating unit:

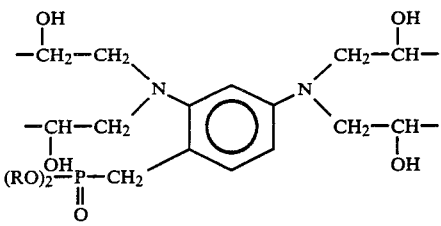

where the R groups of the (RO)$_2$ are the same or different organic groups attached to the oxygen atoms by carbon atoms as is described hereinabove.

The resulting polymers combine one or more properties of heat resistance, low flammability and high char yield with good mechanical properties such as high tensile strength.

The reaction mixture may include other species such as, for example, a mixture of a diamine species of 1, a conventional diamine such as m-phenylenediamine (MPD) or 4,4-diaminodiphenyl sulfone (DDS). These conventional species may serve to impart toughness and/or other desirable properties to the polymer.

DETAILED DESCRIPTION OF THE INVENTION

The polymerization process of this invention and the resulting polymers employ certain methyl disubstituted benzene phosphonyl compounds as monomers. In a preferred embodiment these monomers are diaminobenzene compounds the preparation of which can begin with nitration of a protected phosphonyl methyl benzene of the formula:

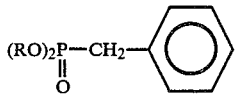

The two protecting groups R may be an alkyl, haloalkyl, or aryl group. Examples of R are methyl, ethyl, n- and iso-propyl, higher (e.g., C4 to C10) alkyl; haloalkyls of the same chain length such as chloro or bromoalkyls, especially chloroalkyl, such as 2-chloroethyl; aromatic groups, such as phenyl, and the like. Other equivalent non-nitratable R groups may be used as well. The two R groups are usually identical and may if desired be a single alkylene such as from 3 to 6 carbons bridging and protecting both phosphonyl hydroxyls. Preferred R groups are 1 to 4 carbon alkyls and haloalkyls and phenyls. Ethyl and 2-chloroethyl groups are most preferred R groups.

Compound A may be produced by the Michaelis-Arbuzov reaction of benzyl bromide with a suitable trialkylphosphite or other equivalent protected phosphate. See, G. M. Kosolapoff and L. Maier, "Organic Phosphorus Compounds", Wiley Interscience, 1973, Vol. 7, page 184.

The nitration of compound A may be carried out by direct nitration. This may be effected by contacting the compound A with an excess beyond two equivalents of nitric acid in fuming sulfuric acid under anhydrous conditions at elevated temperatures. Generally, the amount of nitric acid is from about 2.1 to about 10 moles per mole of nitratable benzene rings. The elevated temperature is typically from about 40° C. to 90° C., preferably about 45° C. to 65° C. This reaction generally takes from about 0.5 to 8 hours to complete.

The product of this nitration is a mixture of 2,4 and 2,6 dinitro phosphonyl methyl benzenes of the formula:

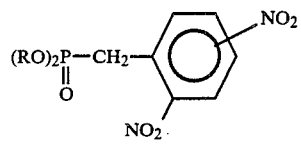

If desired, the isomers may be separated from one another, e.g., by crystallization, but for many purposes such separation is not necessary. The 2,4-isomer is greatly predominant and for most practical uses the mixture may be regarded as the 2,4-dinitro (and subsequent 2,4-diamino) compounds. Although a mixture, B and C may be referred to as a compound.

In the next step the dinitro compounds B are reduced to produce the diamino compounds of the formula:

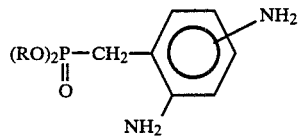

This reduction may be carried out by any of the methods known to the art for reducing aromatic nitrates. A preferred method is catalytic reduction using molecular hydrogen and a supported catalyst such as a supported noble metal catalyst, for example, platinum or palladium on an inert organic oxidic support or carbon. This reduction is exothermic and can be conducted at temperatures from about ambient to about 100° C. and hydrogen partial pressures of from about 1 atmosphere to 20 atmospheres or more. The reaction is continued until no more hydrogen is taken up. The reduction is carried out with the dinitro compound dissolved in a non-aqueous medium, for example, a lower alkanol such as methanol or ethanol.

The most preferred starting material is a mixture of 1-[di(2-chloroethoxyphosphonyl)methyl]-2,4- and -2,6-diaminobenzenes (1a). In this mixture as a consequence of the method of synthesis (see Example 3 below) the 2,4-isomer predominates. It is unnecessary for purposes of the present invention to separate the isomers. 1a, although a mixture, will be referred to as a compound.

Compound 1a has the formula:

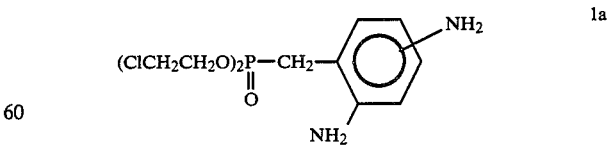

The compound 1a is then used to cure a polymerizable monomer. When the monomer is polyfunctional with respect to the moiety which undergoes polymerization, the resulting polymer will be crosslinked.

The invention will now be described with reference to 1a (the chloro species described above) and certain commercially available epoxides I, II and III, described in Table 1, as follows:

in these tables identical with symbols in Table 2 have the same meaning.

TABLE 1
Chemical Structure of Epoxy Resins

| EPOXY RESIN | EEW | STRUCTURE |
|---|---|---|
| I (EPON 828) | 185-192 | $CH_2\text{—}CH\text{—}CH_2\text{—}O\text{—}C_6H_4\text{—}C(CH_3)_2\text{—}C_6H_4\text{—}O\text{—}CH_2\text{—}CH\text{—}CH_2$ with epoxide groups |
| II (XD 7342) | 162 | $[CH_2\text{—}CH\text{—}CH_2\text{—}O\text{—}C_6H_4\text{—}]_3 CH$ with epoxide groups |
| III (MY 720) | 105.5 | $[CH_2\text{—}CH\text{—}CH_2\text{—}]_2 N\text{—}C_6H_4\text{—}CH_2\text{—}C_6H_4\text{—}N[CH_2\text{—}CH\text{—}CH_2]_2$ with epoxide groups |

Homogeneous mixtures of 1a and the epoxy materials were prepared by dissolving the reactants in acetone and removing the acetone under reduced pressure to avoid prepolymerization. The proportions of 1a and epoxy material were in certain cases 0.5 mol of 1a per epoxy equivalent weight (EEW) and in other cases 0.25 mol of 1a per EEW. Identical mixtures were made using m-phenylenediamine (MPD) and 4,4-diaminodiphenyl sulfone (DDS) which are conventional curing agents for epoxy materials.

These homogeneous mixtures, after solvent removal, were heated and the course of polymerization and of pyrolysis of the polymer were analyzed and determined by differential scanning calorimetry (DSC) and thermogravimetric analysis (TGA). Table 2 sets forth results.

TABLE 2
Thermal Characteristics of Epoxy Resin - Curing Agent Compositions*

| Epoxy Resin | Curing Agent | Polymerization | | | Pyrolysis | | |
|---|---|---|---|---|---|---|---|
| | | $T_1$ (°C.) | $T_2$ (°C.) | $\Delta H_{pol}$ (J/g) | $T_3$ (°C.) | $T_4$ (°C.) | $\Delta H_{pyr}$ (J/g) |
| I | 1a | 156.9 | 201.0 | 145 | 270.1 | 288.9 | 94 |
| I | MPD | 140.4 | 177.3 | 308 | 364.0 | 386.6 | 70 |
| I | DDS | 191.8 | 243.7 | 224 | 352.5 | 389.0 | 102 |
| II | 1a | 151.3 | 190.7 | 172 | 278.2 | 307.1 | 210 |
| II | MPD | 133.7 | 165.3 | 320 | 360.0 | 387.1 | 121 |
| II | DDS | 186.9 | 233.8 | 276 | 359.9 | 395.9 | 97 |
| III | 1a | 174.7 | 213.7 | 208 | 221.7 | 269.1 | 214 |
| III | MPD | 153.2 | 177.8 | 356 | 268.6 | 291.0 | 85 |
| III | DDS | 216.3 | 249.7 | 331 | 304.8 | 352.7 | 100 |

*0.25 mol of curing agent/EEW

In Table 2, $T_1$ is the temperature of onset of polymerization, $T_2$ is the maximum temperature of the polymerization exotherm, $\Delta H$ pol is the heat of polymerization (the area under the exotherm curve), $T_3$ is the temperature of onset of pyrolysis, $T_4$ is the maximum temperature of pyrolysis and $\Delta H$ pyr is the heat of pyrolysis.

Tables 3, 4 and 5 set forth data demonstrating superior fire resistance of 1a/epoxy polymers. Symbols used in these tables identical with symbols in Table 2 have the same meaning.

TABLE 3
Thermal Characteristics of Epoxy Resin - 1a Compositions Under Various Reactant Ratios

| Epoxy resin | Polymerization | | | Pyrolysis | | |
|---|---|---|---|---|---|---|
| | $T_1$ (°C.) | $T_2$ (°C.) | $\Delta H_{pol}$ (J/g) | $T_1$ (°C.) | $T_2$ (°C.) | $\Delta H_{pyr}$ (J/g) |
| 0.50 mol of 1a/epoxy equivalent weight | | | | | | |
| I | 146.3 | 185.0 | 186 | 240.1 | 273.6 | 102 |
| II | 143.9 | 176.9 | 129 | 228.0 | 278.7 | 73 |
| III | 161.0 | 189.9 | 185 | 220.9 | 246.0 | 66 |
| 0.25 mol of 1a/epoxy equivalent weight | | | | | | |
| I | 156.9 | 201.0 | 145 | 270.1 | 288.9 | 94 |
| II | 151.4 | 190.7 | 172 | 278.2 | 307.1 | 210 |
| III | 174.7 | 213.7 | 208 | 221.7 | 269.1 | 214 |

TABLE 5
LOI Values of the Epoxy Resin-Curing Agent Compositions*

| Epoxy resin | Curing Agent | P % | Cl % | N % | LOI |
|---|---|---|---|---|---|
| I | 1a | 2.87 | 5.64 | 2.59 | 28.1 |
| I | MPD | 0 | 0 | 3.25 | 27.2 |
| I | DDS | 0 | 0 | 2.79 | 22.9 |
| II | 1a | 3.18 | 6.26 | 2.87 | 29.6 |
| II | MPD | 0 | 0 | 3.70 | 28.0 |
| II | DDS | 0 | 0 | 3.12 | 25.3 |
| III | 1a | 4.14 | 8.14 | 7.47 | 59.3 |
| III | MPD | 0 | 0 | 10.57 | 30.8 |
| III | DDS | 0 | 0 | 8.36 | 29.0 |

*0.25 mol of curing agent/EEW

From Table 3, it will be seen that the higher 1a/EEW ratio (0.5 mol/EEW) had lower polymer decomposition temperatures than the lower 1a/EEW ratio (0.25 mol/EEW). However, owing to the greater P and Cl content of the polymers they had a higher LOI (limiting oxygen index).

Table 4 compares the 1a/epoxy polymers with MPD/epoxy and DDS/epoxy polymers.

Table 5 compares limiting oxygen index (LOI) for the various polymers.

TABLE 4

| | | In nitrogen | | | | In air | | | | |
|---|---|---|---|---|---|---|---|---|---|---|
| Epoxy resin | Curing Agent | PDT (°C.) | $PDT_{max}$ (°C.) | TCP (°C.) | Char yield (%, 650° C.) | PDT (°C.) | $PDT_{max}$ (°C.) | TCP (°C.) | Char yield (%, 650° C.) | $PDT_{air}/PDT_{N2}$ |
| I | 1a | 287.0 | 351.6 | 500.0 | 42.0 | 261.5 | 309.1 | 550.0 | 23.0 | 0.91 |
| I | MPD | 399.2 | 436.3 | 476.9 | 18.5 | 388.1 | 431.9 | 495.4 | 8.0 | 0.97 |
| I | DDS | 416.7 | 459.1 | 503.3 | 15.0 | 403.9 | 447.3 | 511.5 | 4.5 | 0.97 |
| II | 1a | 265.0 | 317.7 | 550.0 | 56.0 | 265.0 | 315.0 | 615.0 | 38.0 | 1.00 |
| II | MPD | 388.0 | 431.5 | 483.3 | 31.5 | 376.5 | 425.0 | 533.5 | 5.0 | 0.97 |
| II | DDS | 401.7 | 443.3 | 491.0 | 35.0 | 399.2 | 439.5 | 562.0 | 23.5 | 0.99 |
| III | 1a | 235.0 | 297.7 | 550.0 | 53.0 | 235.0 | 295.0 | 650.0 | 22.0 | 1.00 |
| III | MPD | 361.4 | 424.7 | 492.9 | 23.5 | 345.4 | 409.5 | 545.6 | 5.0 | 0.96 |
| III | DDS | 381.7 | 439.2 | 502.7 | 29.5 | 363.9 | 425.1 | 603.2 | 22.5 | 0.95 |

*0.25 mol of curing agent/EEW

As stated above, other species of 1 may be used besides 1a, and other reactants than epoxy materials may be used. Also the mixture may contain other diamines, e.g., MPD or DDS. Examples of the preparation of species of 1 and of the polymerization of these compounds with a dianhydride are provided below. These are presented to illustrate the invention and are not to be construed as limiting its scope which is defined by the appended claims.

EXAMPLE 1

1-[(Diethoxyphosphonyl)methyl]-2,4- and -2,6-dinitrobenzenes

[(Diethoxyphosphonyl)methyl]benzene (21.76 g, 95 mmol) was added dropwise to a mixture of fuming nitric acid (16.3 g) and fuming sulphuric acid (54.30 g), containing 30% $SO_3$, at 55° C. The addition of the phosphonate lasted 1 hour and subsequently the mixture was heated at the same temperature for another hour. The mixture was poured into 1 liter of ice water and extracted with chloroform (300 ml). The chloroform solution as washed with 5% sodium bicarbonate solution and with water, dried ($Na_2SO_4$) and concentrated to give a yellowish solid (24.16 g, 80%, mp 78°–82° C.). Recrystallizations from ether-chloroform (10:1 vol/vol) gave an analytical sample: mp 101°–104° C. The structure was confirmed by $^1$H-NMR and chemical analysis.

EXAMPLE 2

1-[(Diethoxyphosphonyl)methyl-2,4- and -2,6-diaminobenzenes

The recrystallized product of Example 1 (2.00 g, 6.28 mmol) was dissolved in 50 ml of absolute ethanol and a small amount of catalyst, 10% palladium on carbon, was added. The hydrogenation was carried out on a Parr apparatus under a pressure of 3.5 atm at room temperature until no more hydrogen was taken up (about 3 hrs). After the filtration of the catalyst and the removal of the volatile components under vacuum a viscous undistillable liquid was obtained (1.57 g, 97%), which could not be induced to crystallize.

The dihydrochloride salt was formed by passing anhydrous hydrochloride gas through its solution in chloroform. This salt was a nearly white solid and after recrystallizations from ethanol-ether (1:6 vol/vol) an analytical sample was obtained which was decomposed at temperature higher than 128° C. Structure was confirmed by $^1$H-NMR and chemical analysis.

EXAMPLE 3

1-[Di(2-chloroethoxyphosphonyl)methyl]-2,4- and -2,6-dinitrobenzenes

[Di(2-chloroethoxyphosphonyl)methyl]benzene (5.13 g, 17 mmol) was added dropwise to a mixture of fuming nitric acid (4.0 g) and fuming sulphuric acid (13.0 g), containing 30% $SO_3$ at 55° C. The addition of the phosphonate lasted 0.5 hour and subsequently the mixture was heated at the same temperature for 4 hours longer. The mixture was poured into 300 ml of ice water and extracted with chloroform (150 ml). The chloroform solution was washed with 5% sodium bicarbonate solution and with water, dried ($Na_2SO_4$) and concentrated to give a viscous liquid (4.92 g) diluted with about 100 ml of acetone-ether (1:10 vol/vol). Upon cooling of the solution the dinitrobenzene was crystallized (2.80 g, 42%, mp 79°–84° C.). Recrystallizations from acetone-ether (1:10 vol/vol) gave an analytical sample: mp 83°–85° C. Structure was confirmed by $^1$H-NMR and chemical analysis.

EXAMPLE 4

[Di(2-chloroethoxyphosphonyl)methyl]-2,4- and -2,6-diaminobenzenes Ia

Recrystallized product of Example 3 (2.27 g, 58.6 mmol) was dissolved in 40 ml of absolute ethanol and a small amount of catalyst, 10% palladium on carbon, was added. The hydrogenation was carried out as in Example 2. A solid product was obtained (1.88 g, 98%, mp 105°–109° C.). Recrystallizations from benzene gave an analytical sample: mp 116°–119° C. Structure was confirmed by $^1$H-NMR and chemical analysis.

EXAMPLE 5

Polymerization of a Diamino Monomer

The dihydrochloride salt of 1-[(diethoxyphosphonyl)methyl]-2,4- and -2,6-diaminobenzene (2.21 g, 6.66 mmol), the dihydrochloride salt of m-phenylenediamine (6.21 g, 34.3 mmol), dimethylacetamide (70 ml) and pyridine (12.96 g, 163.84 mmol) were placed in a three-necked flask equipped with a mechanical stirrer and a dropping funnel. The mixture was stirred to obtain a solution and cooled to 0°–1° C. There was added dropwise under nitrogen atmosphere a solution of isophthaloyl chloride (8.32 g, 40.96 mmol) in dimethylacetamide (30 ml) allowing the reaction 10 minutes in cooling and then 60 minutes at room temperature. The reaction mixture was added to about 700 ml of methanol and the product which precipitated was filtered, washed repeatedly with methanol and dried at 80° C. in a vacuum oven. The polymer (9.70 g, 90%) had an inherent viscosity 0.22 dl/g in sulphuric acid 98% (0.5% conc. at 25° C.) and contained 1.44% phosphorus. This polymer had a Limiting Oxygen Index (LOI) value 52.0 and an anerobic char yield at 700° C. 72%. The poly-m-phenylene isophthalamide (Nomex) which may be considered as its parent polyamide had a Limited Oxygen Index 46.4 and an anerobic char yield 57%. (Oxygen index value was measured by the method of ASTM D 2863-70. Anerobic char yield was that described by Van Krevolin, *Polymer,* 16, 615 (1975).

The diamines of the present invention may also be polymerized with a variety of dianhydrides and diacylchlorides (and with higher functionality anhydrides and acylchlorides) e.g., pyromellitic anhydride and the dianhydride

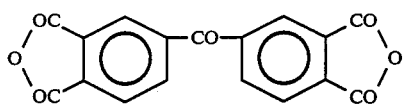

and isophthaloyl chloride, 1,3-[(C═O)Cl]$_2$φ.

It will therefore be apparent that the new and useful polymers, and new and useful methods of synthesizing the same have been provided. These polymers are useful as resin matrices for composites. The composites possess both high temperature resistance and fire resistance. These laminating and matrix resins can be combined with either glass, KEVLAR ® or graphite fibers in the form of either unidirectional tape or fabric, which in turn can be fabricated into secondary composites, such as composite sandwich panels for aircraft interiors. Another application of these compounds is the use of these resins as encapsulating or potting compounds when the monomers are reacted with epoxy resins. These resins will be more flame and fire-resistant when compared with conventional epoxy resins.

While the present invention has been described with reference to specific embodiments thereof, it will be understood by those skilled in this art that various changes may be made and that equivalent steps may be substituted without departing from the true spirit and scope of the present invention. All such modifications or changes are intended to be included within the scope of the following claims.

We claim:

1. A method of producing a phosphorus-containing polymer which comprises polymerizing a compound of the formula:

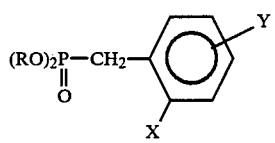

with a polyfunctional monomer, R being an organic group attached to the oxygen atom through a carbon atom and X and Y are functional groups polymerizable with the polyfunctional monomer.

2. The method of claim 1 wherein X and Y are amino groups in the 2,4-position, 2,6-position or mixtures of the 2,4- and 2,6-positions.

3. The method of claim 2 wherein the polyfunctional monomer is a 1,2-epoxide having at least two 1,2-epoxy groups.

4. The method of claim 2 wherein R is a halogen-containing lower alkyl group.

5. The method of claim 3 wherein R is a halogen-containing lower alkyl group.

6. The method of claim 1 of producing a phosphorus-containing polymer which comprises polymerizing a compound of the formula:

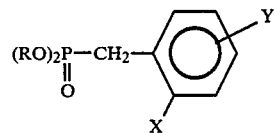

wherein R is an organic group attached to the oxygen atom through a carbon atom and is the same or different, and X and Y are both amino with a polyfunctional organic monomer wherein the monomer is a di-1,2-epoxide.

7. A polymer of a compound of the formula:

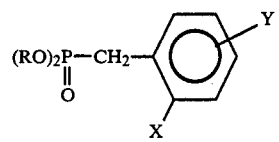

with a polyfunctional monomer, R being an organic group attached to the oxygen atom through a carbon atom and X and Y are functional groups polymerizable with said polyfunctional monomer.

8. A polymer of claim 7 wherein R is a halo alkyl group.

9. A polymer having the repeating unit:

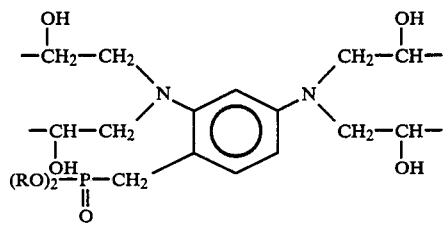

wherein the R groups of the (RO)$_2$ are the same or different organic groups attached to the oxygen atoms by carbon atoms.

10. A polymer of claim 9 wherein R is a haloalkyl.

11. The polymer of claim 7 wherein the compound has the formula:

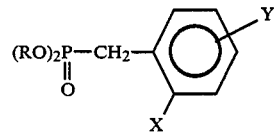

wherein R is an organic group attached to the oxygen atom through a carbon atom and is the same or different, and X and Y are each amino.

* * * * *